United States Patent [19]
Holyman

[11] 3,731,207
[45] May 1, 1973

[54] SYSTEM FOR IDENTIFYING PHASE CODED GROUPS OF RADIO FREQUENCY SIGNALS

[75] Inventor: Brian Thomas Holyman, London, England

[73] Assignee: Decca Limited, London, England

[22] Filed: Aug. 30, 1971

[21] Appl. No.: 176,065

[30] Foreign Application Priority Data

Sept. 28, 1970 Great Britain.....................46,115/70

[52] U.S. Cl.....................................328/119, 328/37
[51] Int. Cl...............................................H03k 5/20
[58] Field of Search................................328/119, 37

[56] References Cited

UNITED STATES PATENTS

| 3,453,551 | 7/1969 | Haberle | 328/119 |
| 3,483,474 | 12/1969 | Meranda | 328/119 |
| 3,550,017 | 12/1970 | Whalen | 328/119 X |

*Primary Examiner*—John S. Heyman
*Attorney*—John A. Mawhinney

[57] ABSTRACT

A system for identifying phase coded groups of radio frequency pulses. Two sampling means provide, at times corresponding to the interval between pulses, a single binary digital sample of the radio frequency signal and the complementary digit. Shift registers receive the sample and its complement respectively. AND circuits are coupled to mutually exclusive sets of stages of the shift register in order to detect the code characteristic of the desired group of pulses. The system is useful in Loran C receivers and otherwise.

9 Claims, 4 Drawing Figures

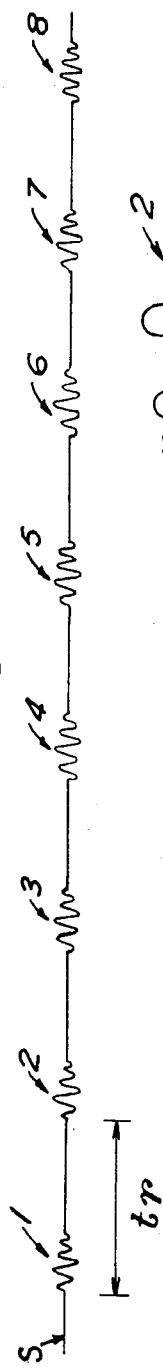
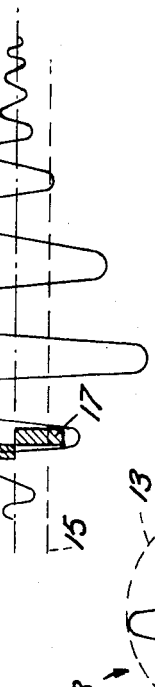
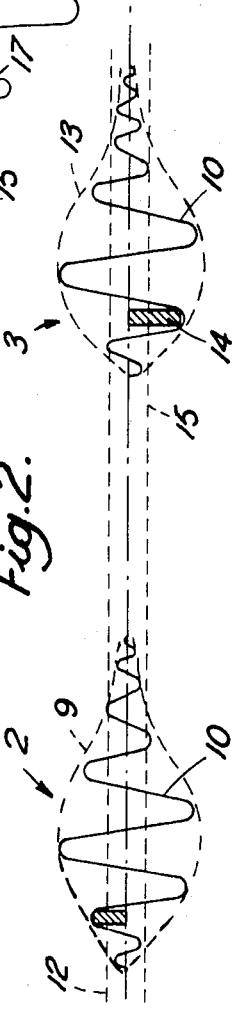
Fig. 1.
Fig. 2.
Fig. 3.

SYSTEM FOR IDENTIFYING PHASE CODED GROUPS OF RADIO FREQUENCY SIGNALS

This invention relates to systems for identifying, in an input radio frequency signal, a phase coded group of radio frequency pulses.

The present invention is particularly, although not exclusively, concerned with identifying, from a radio frequency signal received at a receiver, a group of phase coded signals from either a master or slave station forming part of the radio navigation system known as Loran C. In order to explain the purpose of the invention it is convenient to describe very briefly by way of example the salient characteristics of this type of navigation system. As is well known the Loran C system is a time-displacement, hyperbolic radio navigation system with which, by comparing the times of arrival of pulses radiated from a master station and a slave station, it is possible to determine the location of the receiver as on a hyperbolic position line of which the master and the slave stations are foci. Another determination of the difference between arrival times of pulses radiated from the master and another slave station yields another hyperbolic position line intercepting the first at the location of the receiver. Although with such a system it is possible to obtain a position fix if in any cycle of operation a single pulse is radiated from the master and each of the slave stations it is the practice with the Loran C system to radiate, instead of a single pulse, a group of pulses with a predetermined repetition interval within the group. This facilitates the raising of the average level of power transmitted, without needing to increase unduly the peak power radiated, and facilitates the accurate determination of a position line despite the presence of skywave.

The pulses in a group are each constituted by a pulse comprising a number of cycles of a radio frequency carrier which, in the Loran C system, is at a frequency of 100 kHz. The phase relationship between the cycles in the pulse and a reference, continuous wave signal is shifted from pulse to pulse in the group. Normally some of the pulses in a group have their cycles of the carrier in phase with the reference signal and the other pulses in the group have their cycles of the carrier 180° out of phase with the reference signal. The reference signal, called hereinafter simply reference, is generated at each transmitter but not radiated. The phase coding is different for the master and slave stations through normally related; moreover the pulse transmissions from any particular station normally alternate between two codes particular to that station. However, as will be seen hereinafter, the present invention is not limited for use with any particular practice of coding or indeed any particular number of pulses in a group. Normally the Loran C transmission from a station comprises, for each cycle of operation, a radiation of eight pulses at a predetermined repetition interval, each pulse lasting for approximately 270 microseconds that is to say approximately 27 cycles of the carrier signal. The shape of the pulse is determined by considerations of ease of sampling and the effect of skywave on different pulse shapes. There is moreover after each group of 'master' station pulses a ninth pulse which can be used for visual identification of the master signals on an oscilloscope. For the purposes of the present invention the existence of the ninth pulse can be ignored.

The present invention is, as mentioned above, concerned with the identification of a group of pulses appearing in a received radio frequency signal. This will facilitate the bringing into operation of the various sampling and timing circuits which use the received pulses to obtain a position fix.

According to the invention, a system for identifying, in a radio frequency signal, phase coded groups of radio frequency pulses with a predetermined repetition interval between the pulses in a group, comprises means for providing, at intervals corresponding to the said repetition interval, a binary digital signal representative of a sample of the radio frequency signal, a first shift register arranged to receive the representative signals successively, the contents of the shift register being shifted by the arrival of each new representative signal, a detector for detecting the presence, in at least part of the first shift register, of signals conforming to a predetermined code, a second shift register arranged to receive binary signals complementary to those received by the first shift register, the detector being arranged to detect correspondence of the binary values of all the signals in the stages of the first register that should hold a binary signal of one value together with all the signals in those stages, of the second register, corresponding to the stages other than those that should hold that binary value in the first register.

The obtaining of the samples, preferably by means of a sampling means which is clock controlled, and the successive storing of the binary digital signals in the shift register corresponds in effect to the combine of the radio frequency signals at intervals corresponding to the predetermined repetition interval. The combing is performed through the whole radio frequency signal and at any time the shift register would store binary digital signals representative of the last $n$ samples where $n$ is the number of stages in the shift register. Conveniently the number of stages in the shift register corresponds to the number of pulses in the coded group of which the search is made.

If one assumes for convenience that the coded group has eight pulses of which the third, fourth, sixth and eighth pulses comprise radio frequency cycles 180° out of phase with the reference but the first, second, fifth and seventh pulses are in phase with the reference (this being the coding of one of the groups radiated by a master station in the Loran C system) then if the eight samples in the register (or the eight samples stored in a particular group of eight adjacent stages) are in fact samples of the eight pulses of the coded group, the signals stored in the register will be 11001010 or 00110101 according to when the sampling instants occur in relation to the radio frequency cycles. These two groups are in fact the binary complement of each other and present essentially the same information. It would be possible to use only one shift register and to detect correspondence between its contents and the actual phase coding of the group for which the search is made. Since the complement of the code is just as likely to occur in the register as the predetermined code, it is desirable to provide means for detecting the presence in the same or, preferably, another shift register signals conforming to the binary complement of the predetermined code. Two shift registers might be fed from the same sampling means but it is preferable as mentioned hereinafter to provide a separate clock controlled sampling means for each register.

Preferably therefore two shift registers are provided, one arranged to receive signals as aforesaid and the other arranged to receive binary signals complementary to those received by the first register. With this provision, considering the example given above, the existence of the required code may be detected by detecting correspondence of the binary values of all the signals in stages of the first register that should hold a binary signal of one value together with all the signals in those stages of the second register corresponding to the stages other than those which should hold that binary value in the first register. Thus to detect the group given above, the first, second, fifth and seventh stages of the first register can each be connected to a respective input of an eight-input AND circuit and the third, fourth, sixth and eighth stages of the second register can be each connected to one of the other four inputs of the AND circuit. The detector may comprise therefore an AND circuit of which the inputs are coupled each to a respective selected stage of one shift register and to a respective one of the stages, of the other shift register, which do not correspond to the said selected stages of the said one shift register. This mode of detection provides excellent discrimination against noise.

In order to provide some discrimination against noise the sampling means may be arranged to provide a digital signal of a predetermined value if the input radio frequency signal is greater than a predetermined non-zero value. Using two registers, where one shift register receives the binary complement of the signals received by the other shift register, two sampling means may be provided, a first sampling means being arranged to provide a digital signal of a given binary value if the radio frequency signal is more positive than a predetermined non-zero value and a second sampling means arranged to provide a digital binary signal, preferably of said value, if the radio frequency signal is more negative than a predetermined non-zero value. The sampling means are preferably arranged to be controlled in accord with the same clock pulses so that the registers receive from the respective sampling means signals representative of simultaneous samples.

Using one sampling means or a pair of simultaneously operable sampling means in the manner just described it can happen that the radio frequency pulses are sampled at times when the radio frequency carrier is at a low value insufficiently positive or negative to cause an output from the sampling means. For this reason it is convenient to provide a second similar system with sampling means, a shift register or registers and detecting means, wherein the sampling means in the second system is or are arranged to provide binary signals representative of samples taken at instants differing from the instants of sampling of the first system by an odd multiple of a quarter cycle of the radio frequency signal. With two systems arranged thus, if the sampling instants of the first system correspond approximately to the instants when the radio frequency carrier is near a zero value the sampling instants of the second system will correspond approximately to the peaks of the radio frequency signal and if the first system does not provide proper signals to the or each respective shift register then the second system will do so.

Reference will hereinafter be made to the accompanying drawings, in which:

FIG. 1 is an illustration of a group of phase coded radio frequency signals;

FIG. 2 is an illustration to a larger scale of two of the pulses shown in FIG. 1;

FIG. 3 is another explanatory drawing illustrating a sampled radio frequency pulse.

Figure 4:
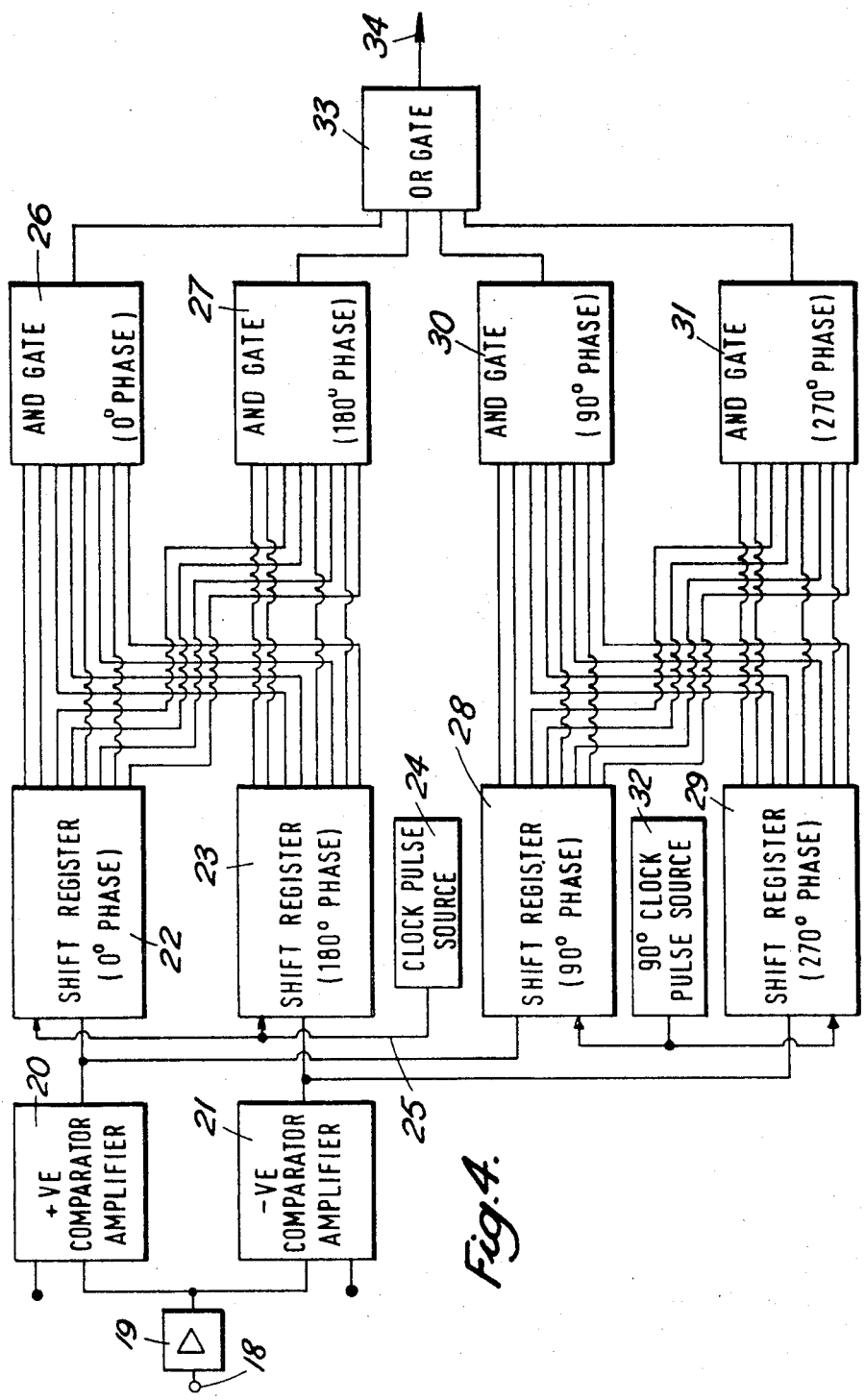
FIG. 4 is a schematic diagram illustrating one embodiment of the invention.

In FIG. 1 is shown a group of spaced radio frequency pulses 1 to 8, not to scale, constituting one of the coded groups of pulses in a signal S radiated by a master station in the Loran C navigation system. In FIG. 1 the pulses 1, 2, 5 and 7 comprise radio frequency cycles in phase with a radio frequency continuous wave reference whereas the pulses 3, 4, 6 and 8 comprise radio frequency cycles 180° out of phase with the reference. The repetition interval $t_R$ between the pulses is normally 1 millisecond. As is well-known a Loran C master station normally radiates the code shown in FIG. 1 alternately with a code in which the 2nd and 3rd pulses comprise radio frequency cycles 180° out of phase with the reference but all the other pulses comprise radio frequency cycles in phase with the reference. The slave stations radiate groups coded in a manner similar to the master signals except that the first four pulses of a master group are coded in the same manner as the last four pulses of the slave group radiated in the previous transmission cycle and the last four pulses of the master group are coded in the same manner as the first four pulses of the previous slave group radiated in the previous transmission cycle. The present invention will be described with reference to a system for identifying a master group of the coding shown in FIG. 1. However identification of groups coded in different manners such as the other coding used for master signals or a slave group can be carried out along precisely analogous lines which will be explained later.

The group of signals shown in FIG. 1 is normally followed by an interval in which no pulse is radiated from the particular station, then a further group radiated according to a different coding, then a further interval after which the cycle is repeated with a radiation of a group of pulses coded in the manner shown in FIG. 1. With the present invention an input signal consisting of the spaced groups with mainly noise signals in between is to be sampled at intervals spaced apart by $t_R$ the repetition interval of the pulses in a group. Binary signals corresponding to the successive samples are fed to and shifted successively through a shift register which in the present case will preferably have eight stages. Sampling in the intermediate periods will not produce any meaningful output from a sampling means and so in those periods the signals fed to the shift register will be a succession of binary signals coded randomly or otherwise unlike the required coding. Eventually however one of the pulses of FIG. 1 will be sampled and give rise to a binary 1 or binary 0 which will be stored in the first stage of the shift register. If in fact the first sample produces a binary 1 then, because the sampling interval is the same as the repetition interval the next sample will provide a binary 1 which will be fed to the input of the shift register displacing the previous 1 signal to the second stage. The sample of the third pulse will, because the cycle sampled is 180° out of phase with the reference, produce a binary 0 signal, the shift register shifting the two binary 1's to the third and second stages respectively. This process will continue until the contents of the shift register, which conform to the last eight samples taken, correspond to samples of the eight pulses in the coded group.

The action of sampling is illustrated by FIG. 2. This shows the pulse 2 with its pulse envelope 9 and its cycles 10 of the radio frequency carrier 10. At a first sampling instant 11 the radio frequency signal is more positive than a reference value shown by the dashed line 12. This will yield a binary 1 at the output of the sampling means and this binary 1 signal will be passed to a shift register. The next pulse 3 will, because the sampled cycle is 180° out of phase with the original reference cause the feeding of a binary 0 to that shift register when sampled (shown by the sample 14) $t_R$ seconds after the sample 11 because the radio frequency signal at that instant is more negative than the value 12. However there is preferably used a second shift register controlled by a sampling means which provides a binary 1 signal if the radio frequency carrier 10 at the instant of sampling is more negative than a value 15 and under these circumstances the signal representing the sample 14 of the pulse 3 will be a binary 1 fed to the second shift register. Thus the signals fed to the first shift register in respect of the samples 11 and 14 of pulses 2 and 3 shown in FIG. 2 will be 1 and 0 and the signals fed to the second register in respect of the pulses 2 and 3 will be 0 and 1.

FIG. 3 illustrates again the pulse 2. If the instant at which the pulse 2 is sampled occurs when the carrier 10 is near a cross-over point and is accordingly near zero value the sample, illustrated in FIG. 3 by a sampling pulse 16, will be insufficient to cause a digital output because the amplitude of the sample 16 is below the threshold value 12. If however the radio frequency signal is sampled one quarter of a cycle later, as shown by the sample 17, the instant of the sampling will correspond to a time when the radio frequency signal is near a peak and a digital output will be obtained. One sampling instant will occur near a peak of the radio frequency signal if the samples 16 and 17 are separated by any odd multiple of a quarter cycle of the radio frequency signal.

FIG. 4 illustrates in schematic form a system for identifying a group of phase coded pulses using a method as described with reference to the preceding figures. The system of FIG. 4 would normally form part of a receiver for a time-displacement hyperbolic navigation system such as Loran C. As noted above the receiver would normally include various timing and comparison circuits for determining the time displacement of the arrival times of pulses from a master station and slave stations, in order to obtain a position fix. The present invention however is concerned with the automatic identification of a given pulse coded group. The identification of the group would normally be used to initiate or control the operation of the timing and comparison circuits.

Referring now to FIG. 4 an input radio frequency signal, in which a group coded after the manner shown in FIG. 1 is expected to occur, is received at an input terminal 18 which may be coupled to an aerial. The radio frequency signal is amplified by an amplifier 19 and then fed simultaneously to a comparator amplifier 20 and a comparator amplifier 21. The comparator amplifier 20 is arranged to provide a unity binary signal when the amplified radio frequency signal is greater than a predetermined value, corresponding to the threshold 12 of FIG. 2. The comparator amplifier 21 is arranged to provide a unity binary signal when the input radio frequency signal is more negative than a predetermined threshold 15 illustrated in FIG. 2.

The outputs of the comparator amplifiers 20 and 21 are connected respectively to the serial inputs of two shift registers 22 and 23 respectively. The passage of a binary signal into the shift registers is controlled by a clock pulse source 24 so that signals enter the shift registers only at intervals corresponding to clock pulses on a line 25 coupled to the shift registers. Thus the comparator amplifier 20 and the clock pulse source 24 form together a sampling means arranged to provide a binary signal representative of the instantaneous radio frequency signal at intervals corresponding to the clock pulses which are separated by an interval (in this case 1 ms.) corresponding to the interval between radio frequency pulses in the group of pulses which is to be identified.

It will again be assumed that a search is made for the group shown in FIG. 1 and accordingly when samples of all the eight pulses shown in FIG. 1 are in the shift register 22 the values of the binary signals in the stages of the shift register 22 may be 11001010, hereinafter called the zero degree phase code. Alternatively, depending on the precise phase relationship between the sampling instants and the radio frequency signal the shift register 22 may contain 00110101. This will be called the second or 180° phase code. Either condition could be used to identify the group. Now the occurrence of the first code in the shift register 22 could be detected by comparing the contents of that register with signals corresponding to the first code and if there is precise correspondence between the individual signals, that is to say between each signal in the shift register and the corresponding signal in the identifying code, then a comparator means can signal accordingly.

However the occurrence of one of the binary values, in this case zero, will be associated with the failure to detect a sufficient value of a signal. In order to avoid detecting codes including values associated with erroneous codes or insufficient signal strength, it is preferable to adopt a system in which only binary 1's are detected. Since the register 23 will contain signals conforming to the 180° code if the signals in the shift register 22 conform to the zero degrees code and vice versa, a comparator system adapted to identify only binary unity signals will need to detect binary 1 signal in the first, second, fifth and seventh stages of the shift register 22 and the third, fourth, sixth and eighth stages of the shift register 23. This is very conveniently effected by the comparator 26 which comprises an eight input AND gate whose inputs are each coupled to one of the afore-mentioned particular stages of the shift registers 22 and 23. The eight input AND gate will signal the identification of the coded group if in fact the phasing of the sampling instants is such as to provide the zero degree phase code in the shift register 22 and the 180° phase code in the shift register 23. If in fact the phasing of the sampling instants with respect to the carrier signal gives the 180° phase code in the shift register 22 and the zero degree phase code in the shift register 23 then an output from the comparator 27 is obtained. This comparator is constructed exactly like the comparator 26 but its inputs are connected instead to those stages of the shift register 22 which are not connected to the AND gates of the comparator 26 and to those stages of the shift register 23 which are not connected to the comparator 26.

The system of FIG. 4 also includes two shift registers 28 and 29 coupled to comparators 30 and 31 in exactly the same manner as the shift registers 22 and 23 are connected to the comparators 26 and 27. The only difference between the arrangements of these shift registers and their comparators with the arrangements of the shift registers 22 and 23 is that the feeding of samples into the registers 28 and 29 are controlled by a clock pulse source 32 providing clock pulses which are delayed with respect to the clock pulses from the source 24 by an odd multiple, in this case unity, of a quarter of a cycle of the radio frequency carrier signal. As was explained with reference to FIG. 3, if the phasing between the sampling instants determined by the clock pulses from the source 24 and the radio frequency carrier provides samples which are too low in value to provide binary signals into the shift registers 22 and 23 the sampling instants determined by the clock pulses from the source 32 will substantially coincide with peaks of the radio frequency signal and provide meaningful binary signals into the shift registers 28 and 29.

The detection of the required code by any one of the AND gates 26, 27, 30 or 31 is sufficient to indicate that the coded signal has been found and accordingly the outputs from the four AND gates are coupled through an OR gate 33 to an output 34.

It will be appreciated that since the sampling interval is necessarily longer than the duration of each radio frequency pulse it can easily happen that a complete cycle of transmissions may be sampled without finding the coded group. By providing means for altering the timing of the sampling instants by a small fraction of the sampling interval the search can be continued until the group is found.

In order to ensure that the coded group will eventually be found control means acting on the clock pulse sources advance the timing of all the clock pulses in steps of 0.1 milliseconds; after 10 cycles of advancement the clock pulses effectively revert to their original timing.

In a complete system the four shift registers would feed a further three groups of four coincidence comparators for detecting the other codes radiated by the master station and the slave stations.

There follows a short explanation of how the present invention may be used in a Loran C receiver. Such a receiver contains three pedestal generators, designated master, slave A and slave B which produce sets of eight tracking gates required to sample the corresponding sets of pulses transmitted by the master and slave stations in the chain of transmitting stations. The sampled information obtained from the tracking gates is integrated and used in automatic frequency control and automatic gain control loops which enable each generator to track its corresponding signal. In order to synchronize the eight tracking gates with the groups of transmitted pulses a "signal found" condition provided by the output from the system of FIG. 4 is used to reset the master pedestal generator such that the eight tracking gates occur in coincidence with the eight clock pulses which are associated with the samples producing the "signal found" output. The eight tracking gates are synchronized and then used to sample and check the signal which they straddle and on receipt of a positive check the master pedestal generator can be used to track its corresponding signal. Similarly a "signal found" output from systems corresponding to FIG. 4 but adapted to identify the slave groups reset first the slave A pedestal generator and on receipt of a second "signal found" condition the other pedestal generator is reset to enable the receiver to track the transmitted master and slave pulse groups.

I claim:

1. A system for identifying, in a radio frequency signal, phase coded groups of radio frequency pulses with a predetermined repetition interval between the pulses in a group, comprising means for providing, at intervals corresponding to the said repetition interval, a binary digital signal representative of a sample of the radio frequency signals, a first shift register arranged to receive the representative signals successively, the contents of the shift register being shifted by the arrival of each new representative signals, a detector for detecting the presence, in at least part of the first shift register, of signals conforming to a predetermined code, a second shift register arranged to receive binary signals complementary to those received by the first shift register, the detector being arranged to detect correspondence of the binary values of all the signals in the stages of the first register that should hold a binary signal of one value together with all the signals in those stages, of the second register, corresponding to the stages other than those that should hold that binary value in the first register.

2. A system according to claim 1 in which the number of stages in the shift register corresponds to the number of pulses in the coded group for which the search is made.

3. A system according to claim 1 in which the detector comprises an AND circuit of which the inputs are coupled each to a respective selected stage of the first shift register and to a respective one of the stages, of the second shift register, that do not correspond to the said selected stages of the said one shift register.

4. A system for identifying, in a radio frequency signal, phase coded groups of radio frequency pulses with a predetermined repetition interval between the pulses in a group, comprising first sampling means for providing, at intervals corresponding to the said repetition interval, first binary digital signals representative of a sample of the radio frequency signal, second sampling means for providing, at said intervals, second binary signals complementary to the respective first binary signals, a first shift register for receiving the first binary signals successively, a second shift register for receiving the second binary signals successively, a first AND circuit coupled to a first set of stages of said first register and to a second set of stages of said second shift register, said first set being different from said second set, a second AND circuit coupled to the stages, of the said first and second shift registers, which are not in said sets coupled to said first AND circuit, and an OR circuit coupled to the first and second AND circuits.

5. A system according to claim 4 in which said first sampling means comprises a comparator arranged to provide a digital signal of a given binary value if the radio frequency signal is more positive than a predetermined non-zero value and said second sampling means comprises a comparator arranged to provide a digital binary signal, preferably of said value, if the radio frequency signal is more negative than a predetermined non-zero value.

6. A system according to claim 5 wherein a common clock pulse source is coupled to said comparators.

7. A system comprising a first system and a second system, each according to claim 6, in which the clock pulse source of said second system provides clock pulses differing from the clock pulses of the first system by an odd multiple of a quarter cycle of the radio frequency signal.

8. A system according to claim 7 in which control means coupled to the clock pulse sources are provided to advance the timing of all the sampling instants in steps which are integral fractions of the sampling interval.

9. A system for identifying in a radio frequency signal, phase coded groups of radio frequency pulses with a predetermined repetition interval between the pulses in the group, comprising first and second system circuits, each comprising first sampling means for providing, at intervals corresponding to the said repetition interval a first binary digital signal representative of a sample of the radio frequency signal, second sampling means for providing at said intervals a second binary signal complementary to said first binary signal, said first sampling means comprising a comparator for providing a digital signal of a given binary value if the radio frequency signal is more positive than a predetermined non-zero value, and said second sampling means comprising a comparator for providing a digital binary signal preferably of said value if the radio frequency signal is more negative than a given non-zero value, a single clock pulse source being coupled to said first and second comparators, first and second shift registers for receiving the first and second binary signals respectively, a first AND gate coupled to a first set of stages of the first register and to a second set of stages of the second register, the stages of said first set being different from the stages of said second set, and a second AND circuit coupled to the stages of said first and second registers that are not coupled to the first AND gate, the clock pulse source of the second system circuit providing clock pulses in quadrative with the clock pulses of the clock pulse sourse of the first system circuit, and the first and second comparators of the first and second system circuits being the same and an OR circuit coupled to the first and second AND circuits of the first and second system circuits.

* * * * *